TELEVISION CAMERA SYNCHRONIZATION CONTROL SYSTEM

Filed April 26, 1965

INVENTORS
RONALD E. HILEMAN
VINCENT C. OXLEY
BY Spencer E. Olson
ATTORNEY

INVENTORS
RONALD E. HILEMAN
VINCENT C. OXLEY
BY Spencer E. Olson
ATTORNEY

March 25, 1969 R. E. HILEMAN ET AL 3,435,141

TELEVISION CAMERA SYNCHRONIZATION CONTROL SYSTEM

Filed April 26, 1965 Sheet 3 of 6

INVENTORS
RONALD E. HILEMAN
VINCENT C. OXLEY

BY Spencer E. Olson
ATTORNEY

INVENTORS
RONALD E. HILEMAN
VINCENT C. OXLEY
BY Spencer E. Olson
ATTORNEY

INVENTORS
RONALD E. HILEMAN
VINCENT C. OXLEY
BY Spencer E. Olson
ATTORNEY

INVENTORS
RONALD E. HILEMAN
VINCENT C. OXLEY
BY Spencer E. Olson
ATTORNEY

United States Patent Office 3,435,141
Patented Mar. 25, 1969

3,435,141
TELEVISION CAMERA SYNCHRONIZATION CONTROL SYSTEM

Ronald E. Hileman, Clarence, and Vincent C. Oxley, Buffalo, N.Y., assignors to Sylvania Electric Products Inc., a corporation of Delaware Filed Apr. 26, 1965, Ser. No. 450,801
Int. Cl. H04l 7/06
U.S. Cl. 178—69.5 8 Claims

ABSTRACT OF THE DISCLOSURE

A synchronization system for automatically controlling the phase timing of a selected remote television camera from a control center by means of frequency and phase shift corrections of an audio frequency control tone. At the control center, a digital sync separator derives horizontal and vertical frame synchronization signals from composite video information received from the camera. These derived signals are digitally compared with horizontal and vertical reference signals to produce error signals indicative of the direction of phase correction required. In a stepwise manner, the vertical synchronizing error signal advances or retards the frequency of the control tone being transmitted to the camera and the horizontal error signal advances or retards the phase of the control tone. The means for making frequency and phase corrections in the control tone comprises either a digital phase modulator or means for adding or deleting pulses at a specified frequency in the tone generating process.

In a first embodiment, the camera includes a discriminator and logic network to detect the control tone frequency shifts and accordingly advance or retard the camera sync pulse generator in increments of one horizontal line to effect correction of vertical sync pulse timing. era sync pulse generator in increments of one horizontal by use of a phase locked oscillator which drives the camera sync pulse generator and follows the phase shifts of the control tone. In a second embodiment, the camera employs a single phase locked loop which is responsive to both the frequency and phase shifts of the control tone to sequentially effect vertical and horizontal sync pulse time corrections.

This invention relates to a synchronizing system for television cameras. More particularly, the invention relates to a closed loop system for automatically controlling the phase timing of a selected remote television camera from a control center in order to achieve and maintain synchronization of the composite video signal received from the camera with a master timing reference at the control center; control of both horizontal and vertical synchronization may be provided by use of a relatively narrow (audio) bandwidth control signal from the control center to the camera.

In the typical television transmitting facility, the composite video signal from each camera in use is linked to a corresponding monitor receiver at a master control center. It is desirable when using a plurality of television cameras, that the received signal from each camera be synchronized to a common time reference at this switching point, or master control center. Such synchronization permits switching or fading from camera to camera without forcing the receiving system (which may comprise a plurality of receivers) to resynchronize to each camera in turn as it is switched "on line." Resynchronizing action frequently causes a picture "roll" which is visibly objectionable. Further, synchronization of cameras is a necessary requirement if special effects such as vignetting, inserting, and split picture techniques are used.

In studio applications, this objective is accomplished by transmitting video synchronizing information from the master synchronizing signal generator (MSG) to the camera by coaxial cable—a process requiring several megacycles of bandwidth. This same technique can be applied when "picking up" program material from several cities or other distant geographic locations, but at the expense of requiring a wide band transmission facility. Synchronization can also be provided by radio transmission of synchronizing information to remote cameras, which may simultaneously be transmitting program material back to master control by a different wide band channel, but at the cost of requiring separate wide band MSG-to-camera video bandwidth radio transmission channels for each camera, and utilizing extensive, often unavailable channel allocations. Separate channels are required for each camera due to range (distance) differences often encountered from cameras to master control in a remote operation.

A manually operated system has been devised and successfully utilized to synchronize video signals originating in several distant cities wherein a pilot tone in the audio or ultrasonic range is used to control MSG's in the different cities. In this case, the control signal is transmitted above the normal audio on an otherwise occupied class A leased line, or at a plurality of locations as an additional subcarrier on an FM broadcast signal. At the remote MSG location the control tone is multiplied or divided to equal the horizontal scan rate, or a multiple thereof, of the MSG, and through the use of phase-locked oscillator techniques, forces the remote MSG to adjust its timing to follow the control tone. At the central control point, an operator previewing a monitor of the next remote location signal to be switched "on line" manually adjusts the pilot tone generator, by means of an electromechanical resolver, to force the remote location signal into synchronism with the central control MSG. This existing system has a number of disadvantages, however. When the remote location signal is out of synchronism by a large number of horizontal lines, the time and effort required to manually achieve both horizontal and vertical synchronization is far greater than one would wish to tolerate. Also, since the system is not a closed loop all electronic operation, reliability is relatively lower and difficulty is experienced in maintaining synchronization during movement of the camera while on the air. The system lacks many of the features that a fully automatic operation would provide.

With an appreciation of the disadvantages of the above-described wide band and manually operated synchronizing systems for television camera control, applicants have as a general object of this invention to provide a television camera synchronization control system which employs automatic closed loop techniques to achieve and maintain synchronization of the camera video signal received at the master control center with a master timing reference by use of a control signal to the camera which requires only a small fraction of the bandwidth normally required to transmit the composite video sync pattern.

A principal object of the invention is to provide a closed loop system for automatically controlling both horizontal and vertical synchronization of a selected television camera from a control center in which the control signal transmitted to the camera is of audio bandwidth.

A further object is to provide means for automatically controlling the synchronization of each of a plurality of cameras from a common time reference wherein respective signal links from the control center to each camera each use a relatively narrow band control signal to carry both vertical and horizontal synchronizing timing corrections to the camera.

Another object is to provide a closed loop digital electronic control system for television cameras which provides rapid automatic synchronization of both vertical and horizontal sync timing to a master time reference.

A further object of the invention is to provide a television camera synchronization control system which provides an automatic tracking capability.

A still further object is to provide a highly reliable closed loop system for automatically controlling the synchronization of each of a plurality of television cameras from a common time reference which is of relatively low cost and minimum circuit complexity.

Briefly, the foregoing objects are achieved by a synchronizing link which automatically controls the phase timing of a selected television camera synchronizing pulse generator by means of frequency and phase shift corrections of an audio frequency control tone in response to phase comparison of synchronizing signals derived from video information received from the camera and reference signals from a master synchronizing generator. A master control center may employ a plurality of such synchronizing links, all controlled by a single master synchronizing generator. For example, use of two synchronizing links enables the control center to switch one link to control the "on line" camera and switch the other link to control the camera under preview.

Each synchronizing link includes a master control center unit having a control tone transmission link to a selected one of a plurality of television cameras and a composite video receiving link from that camera; the links may be either radio or wire. At the master control center unit a unique digital sync separator derives horizontal and vertical frame synchronizing signals from the received composite video information. These derived signals are respectively phase compared with horizontal and vertical reference signals generated by the master synchronizing generator, and the resulting error signals indicate the direction of phase correction required to achieve synchronization of the phase compared signals. In a stepwise manner, the vertical synchronizing error signal advances or retards the frequency of the control tone being transmitted to the camera, and the horizontal error signal advances or retards the phase of the control tone. At the camera, a synchronizing control circuit uses the received control tone to phase correct the camera synchronizing pulse generator whereby the phase correction of the vertical synchronizing pulses generated thereby is primarily effected by the frequency shifts of the control tone, and the phase correction of the horizontal synchronizing pulses is primarily effected by the phase shifts of the control tone.

In a first embodiment of the invention, the camera synchronizing control circuit includes a discriminator and logic network to detect the control tone frequency shifts and accordingly advance or retard the camera synchronizing pulse generator in increments of one horizontal line to effect correction of vertical sync pulse timing. Phase correction of the horizontal sync pulses is achieved by use of a phase locked oscillator which drives the camera synchronizing pulse generator and follows the phase shifts of the control tone. The vertical sync correction circuitry is designed to be enabled only upon receipt of a specified frequency modulation on the control tone, thereby enhancing reliability under nonoptimum signal to noise ratios. This first embodiments offers the features of improved stability and noise immunity.

A second embodiment of the invention, which implements the system in a somewhat simpler and more economical manner, employs a single phase locked loop in the camera which responds to both frequency and phase shifts of the control tone to sequentially effect vertical and horizontal sync pulse time corrections.

Other objects, features and advantages of the invention, and a better understanding of its construction and operation will be apparent from the following description taken in connection with the accompanying drawings, in which.

Figure 1:
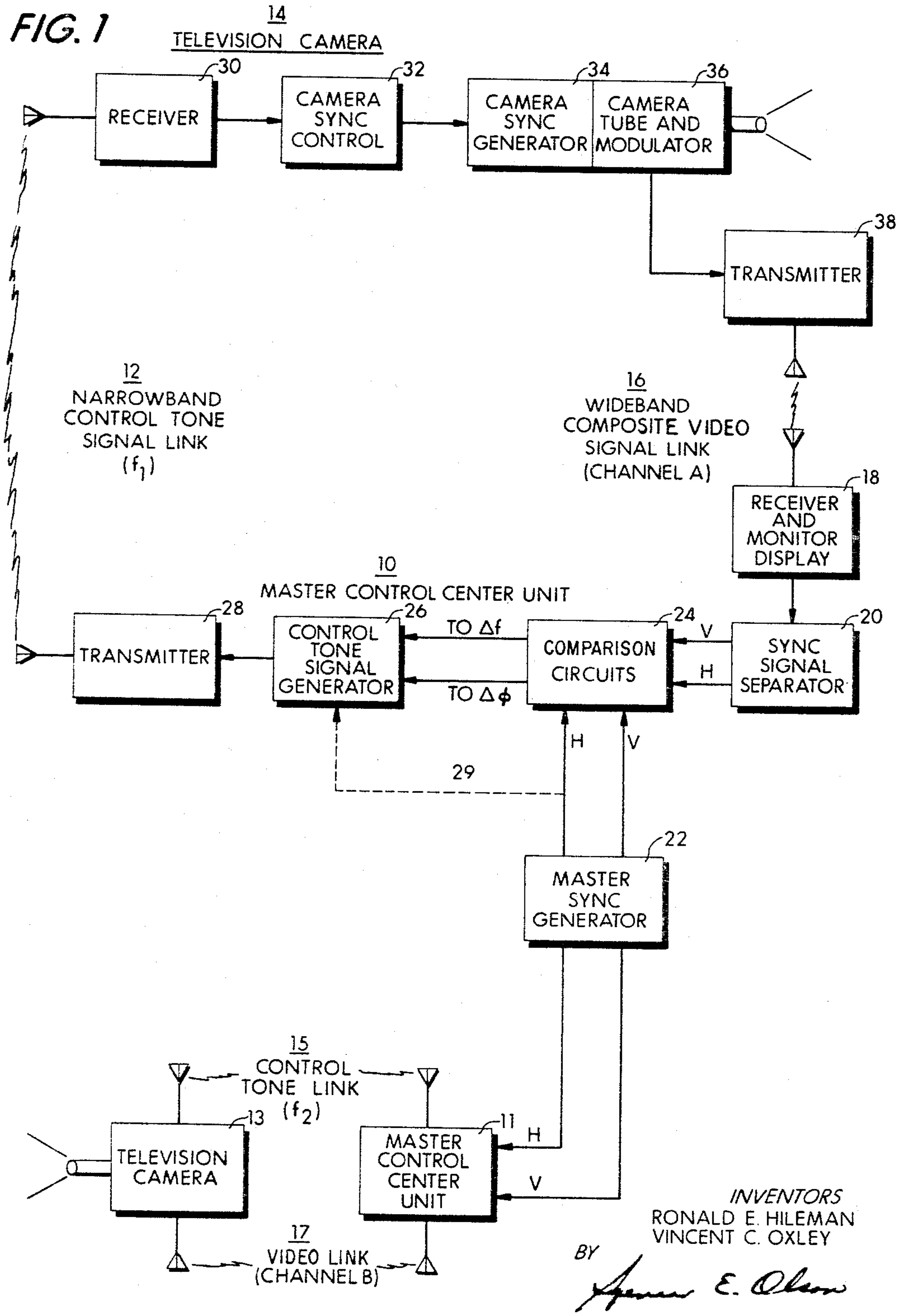
FIG. 1 is a block diagram of a television camera synchronization control system in accordance with the invention.

Referring to the block diagram shown in FIG. 1, a television camera synchronization control system (or synchronizing link) in accordance with the invention basically comprises a master control center unit 10 having a narrowband control tone transmission link 12, of radio or wire, to a selected television camera 14 and a wideband composite video receiving link 16, of radio or wire, from the camera. The master control center unit includes: a conventional monitor-type television receiver 18 for providing a display of the picture being televised and transmitted by camera 14; a synchronizing (sync) signal separator 20 for deriving horizontal and vertical synchronizing signals from the composite video signal being processed by receiver 18; a master synchronizing (sync) generator 22 for providing sources of horizontal and vertical reference signals; a set of comparison circuits 24 for respectively phase comparing the derived horizontal and vertical synchronizing signals with the horizontal and vertical reference signals to produce horizontal and vertical error signals; an audio frequency control tone signal generator 26 including means responsive to the vertical and horizontal error signals for respectively shifting the frequency and phase of the generated control tone; and, a conventional transmitter 28, wherein the audio frequency control tone may be amplified and transmitted to the camera directly, or used to modulate a carrier wave for transmission. The control tone may be derived from one of the master sync generator reference signal sources, as indicated by the dashed line 29.

The camera facility 14 comprises: a conventional receiver 30 for demodulating the control signal from master control 10 and amplifying the recovered control tone with its frequency and phase shift corrections; a camera synchronizing (sync) pulse generator 34; a synchronizing (sync) control circuit 32 which uses the received control tone to phase correct the sync pulse generator 34; a conventional camera tube and modulator circuit 36, including scanning generator; and a conventional composite video signal transmitter 38.

As previously pointed out, master sync generator 22 may serve as a timing reference for a plurality of synchronizing links. For example, in FIG. 1 master sync generator 22 is shown connected to a second link comprising a master control unit 11 and camera 13, each of which may comprise components similar to those described for control center 10 and camera 14; control center 11 has a control tone transmision link 15 to camera 13 and a video receiving link 17 from the camera. The only differences between the sync links would be those required to avoid operational ambiguity for situations in which the cameras are at different ranges from the control center. If the transmission and receiving links are of cable, use of different cables for each of links 12, 15, 16 and 17 will provide the necessary sync control isolation. If radio links are employed, control tone 12 will be transmitted and received at a carrier frequency $f_1$ while control tone 15 will be transmitted and received at a different frequency $f_2$; also, composite video signal 16 will be transmitted and received on a channel A, and video signal 17 will be transmitted and received on a different channel B. In operation, the master time reference 22 and control center units 10 and 11 are located at a master control switching point. If, for example, master control is broadcasting the picture being televised by camera 14, control unit 10 will maintain the video signal 16 received at the switching point in synchronism with the master time reference 22, and monitor 18 will display a synchronized television picture. Now if it is desired to fade into or mix with the picture being televised by camera 13, control unit 11 will force the video signal 17 received at the switching point into synchronism with master time reference 22, regardless of the degree of original asynchronism. Hence, the picture signals from camera 13 and 14 will be in phase at the point of mixing or fading control. The sync links may operate simultaneously without interference from each other by use of separate cables or carrier frequencies as mentioned above.

The camera sync control circuit 32, master control signal separator 20, comparison circuits 24, and control tone signal generator 26 represent the principal features of the invention. Consequently, the construction and operation of these circuits will be explained in full detail. The other components of the system, however, are well known in various modifications to those skilled in the art of radio and television communication. Consequently, there is no need for burdening the present description with details of their overall system organization, structure and operation.

Figure 2:
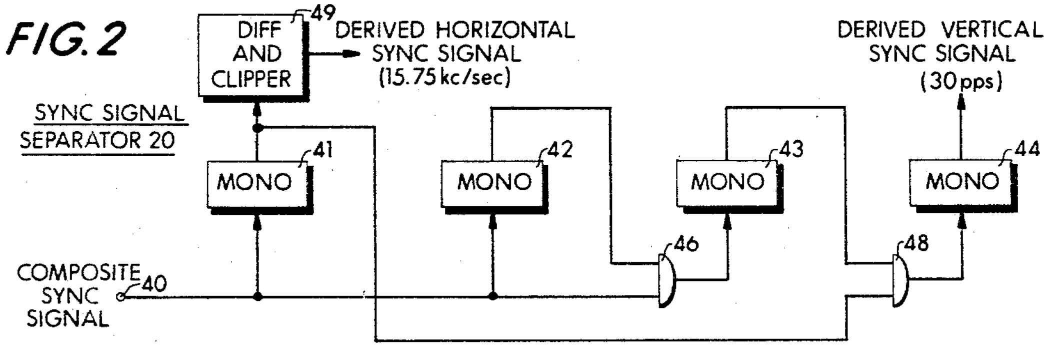
FIG. 2 is a block diagram of a synchronizing signal separator useful in the system of FIG. 1.

The function of synchronizing (sync) signal separator 20 is to derive from the received composite video signal a horizontal synchronizing signal output representative of the horizontal sync pulses of the received signal and a separate vertical synchronizing signal output representative of the vertical (picture) frame rate of the received signal. More specifically, circuit 20 derives a horizontal synchronizing signal comprising a train of pulses at a 15.75 kc./sec. rate, coherently phase related to the horizontal sync pulses of the received signal. The derived vertical synchronizing signal comprises a train of pulses at a 30 p.p.s. rate, coherently phase related to the first field vertical sync pulses of the received signal. A digital sync separator circuit found suitable for accomplishing the aforementioned system functions is shown in FIG. 2. The circuit comprises four monostable multivibrators 41, 42, 43 and 44, and a pair of AND gates 46 and 48.

Figure 3:
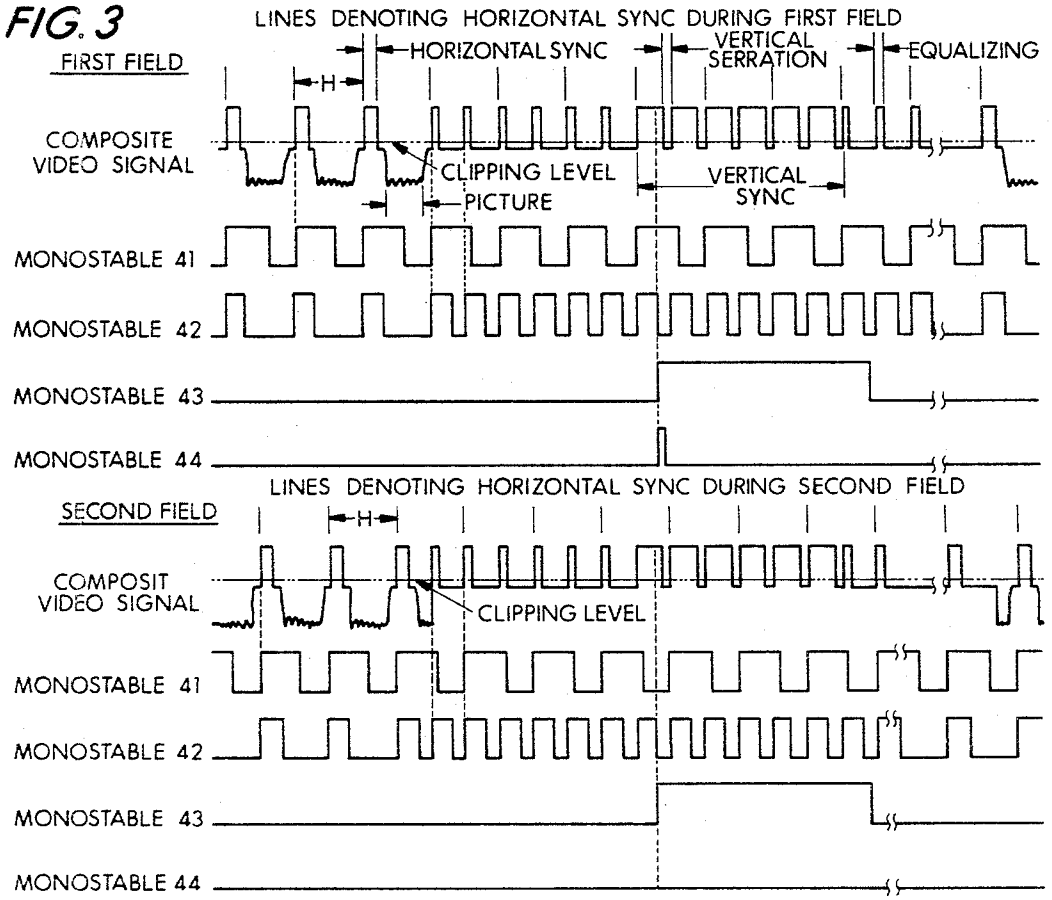
FIG. 3 is a timing diagram of waveforms at the monostable outputs in the block diagram of FIG. 2 as compared with a simplified illustration of the received composite video signal waveform.

To enable a better understanding of the operation of the sync separator shown in FIG. 2, the composition of pertinent portions of the composite video signal waveform will now be reviewed with reference to FIG. 3. Under United States FCC standards for monochrome television transmission, one picture frame comprises 525 horizontal lines, and the frame frequency is 30 c.p.s. Each frame is divided into a first field, consisting of the first 262½ lines, and a second field, interlaced with the first field and consisting of the balance of 262½ lines to complete the frame total of 525 lines. Hence, the field frequency is 60 c.p.s. Each field comprises 247½ visible lines followed by 15 lines used for vertical retrace from the bottom to the top of the picture. This vertical retrace interval is the portion of the composite video signal of particular interest relative to vertical synchronization; the portion of the composite signal waveform denoted as first field in FIG. 3, includes the vertical retrace interval at the end of the first field, and the composite waveform portion denoted as second field includes the vertical retrace at the end of the second field.

It will be noted that the horizontal sync pulses of the second field are displaced by one-half of a line with respect to those of the first field. To avoid loss of interlacing by a resulting half-line displacement of the long vertical sync pulse, equalizing pulses, having half the area and twice the rate of the horizontal sync pulses, are employed in the vertical blanking interval to make the signal identical for both fields in the region of the vertical sync pulse. This equalizing technique also results in the vertical sync pulse being broken up by six serrations. The time period of one horipontal line is denoted by H. The horizontal sync pulse rate or frequency is 30 c.p.s.×525 lines =15,750 c.p.s., and the vertical sync pulse rate is 60 p.p.s. (the field rate).

One of the paths of the composite video signal in a conventional television receiver is through a converter, video IF amplifier, sync clipper, and sync amplifier. The output of the sync amplifier is the signal useful for processing by the sync separator of FIG. 2 and comprises the composite sync pulse train above the clipping level denoted on the composite signal waveforms of FIG. 3. This composite sync signal, from the sync amplifier of receiver 18, is applied via input terminal 40 of sync separator circuit 20 to the trigger inputs of monostables 41 and 42 and an input terminal of AND gate 46. Monostable 41 is triggered at a 15.75 kc./sec. rate by the leading edge of the received horizontal sync pulses, but has a period (output pulse width) greater than one-half of a line (>½H) so that equalizing pulses have no effect. The square wave output of monostable 41 (shown in FIG. 3) is differentiated and clipped in circuit 49 to provide a train of unipolar pulses as the derived horizontal synchronizing signal at 15.75 kc./sec. Monostable 42 has a period greater than the width of a received horizontal pulse, but less than ½H, so that it fires on all received sync pulses, as illustrated by the output waveforms for monostable 42 shown in FIG. 3. The output of monostable 42 is applied via AND gate 46 to the trigger input of monostable 43, which is designed to be fired by the trailing edge of the monostable 42 output pulse. Examination of the waveforms in FIG. 3 will reveal that the first occasion in each field upon which AND gate 46 is enabled for the duration of the monostable 42 output pulse is during the vertical sync pulse, prior to its first serration. Hence, the trailing edge of the monostable 42 output pulse triggers monostable 43 only when a received vertical sync pulse is present. The period of monostable 43 (see FIG. 3) is long enough to have its output pulse trailing edge delayed to a time later than the trailing edge of the received vertical sync pulse. Consequently, the pulse output of monostable 43 is at the vertical sync pulse rate of 60 p.p.s.

Further examination of the waveforms of FIG. 3 reveals that the leading edge of the monostable 43 output waveform occurs in the first or last half of a horizontal line period depending upon the field. To recognize this time scale relationship, the outputs of monostable 41 and 43 are applied to AND gate 48, the output of which is connected to the trigger input of monostable 44. In FIG. 3, it will be noted that during the vertical sync pulse at the end of the first field, the leading edge of the monostable 43 output pulse occurs during the first half of a line and therefore is gated through to fire monostable 44 by the monostable 41 output. However, during the second field, the leading edge of monostable 43 occurs during the last half of a line and is therefore blocked by the monostable 41 output. Consequently, the narrow pulse output of monostable 44 (shown in FIG. 3), which is the derived vertical synchronizing signal, has a 30 p.p.s. rate and can serve as a frame marker.

A first embodiment of the comparison circuit 24 and control tone signal generator 26 will now be described with reference to the block diagram shown in FIG. 4. The function of these circuits is to digitally phase compare the derived horizontal and vertical sync signals with corresponding reference signals to produce horizontal and vertical error signals for respectively phase and frequency correcting a generated sinusoidal control tone. The reference signals, as previously mentioned, are provided by a master sync generator 22, which, for the comparison circuit shown in FIG. 4, may comprise a conventional pulse generator designed to provide output pulse trains at 15.75 kc./sec. (the horizontal reference signal), 30 c.p.s. (the vertical reference signal), and 60 c.p.s Referring to FIG. 4, the 15.75 kc./sec. horizontal reference signal is applied in parallel, via input terminal 50, to the input of an amplifier 52, to an enable input of AND gate 54, and to an inhibit input of AND gate 56. The 15.75 kc./sec. output of amplifier 52 is applied via a ×2 frequency multiplier 53 to AND gates 54 and 56. The outputs of AND gates 54 and 56 are respectively connected to the set and reset input terminals of a flip-flop circuit 58. Consequently, the 31.5 kc./sec. pulse train applied to gate 54 is enabled by the 15.75 kc./sec. input rate to trigger flip-flop 58 to the set condition at a 15.75 kc./sec. rate which is in phase with the horizontal reference signal. Since the 15.75 kc./sec. input applied to gate 56 inhibits every other pulse of the 31.5 kc./sec. input, the output of gate 56 triggers flip-flop 58 to the reset condition at a 15.75 kc./sec. rate which is 180° out of phase with the horizontal reference signal. As a result, flip-flop 58 is in the set condition for one-half of a horizontal line period (½H) and in the reset condition for ½H, thereby providing a useful horizontal time reference.

The set and reset outputs of flip-flop 58 are respectively applied to a pair of AND gates 60 and 62 along with the horizontal sync pulses derived from the received video signal, the derived horizontal signal being obtained from differentiator and clipper circuit 49 (FIG. 2) and applied via input terminal 64 of the comparison circuit. Consequently, if the phase of a derived sync pulse is such that it occurs during the first half of the horizontal line of the flip-flop time reference, gate 60 will allow the pulse and gate 62 will inhibit the pulse, indicating that the derived pulse is late with respect to the time reference. If the derived pulse occurs in the second half of a horizontal line, gate 60 will inhibit the pulse and gate 62 will pass the pulse, indicating that the derived pulse is early.

To enable the derivation of error signals suitable for correcting the phase of the control tone generator, the outputs of AND gates 60 and 62 are connected to a correction control circuit 65. Referring to the logic diagram of FIG. 5, control circuit 65 comprises a 2-bit up-down counter 66, a pair of input AND gates 68 and 70, a pair of output OR gates 72 and 74, and a pair of output AND gates 76 and 78. The output terminal of gate 68 is connected to the backward drive terminal of counter 66 and the output of gate 70 is connected to the forward drive terminal. The AB output lines of the 2-bit counter are connected in parallel to gates 74 and 78 and the $\overline{AB}$ output lines are connected in parallel to gates 72 and 76.

The horizontal error signals for enabling phase correction of the control tone generator are produced at the outputs of gates 76 and 78, designated E and F, respectively. Specifically, a 11 input to AND gate 76 will generate a 1 output comprising a DC signal for enabling a down correction. Any other input combination produces a 0 output, which results in no correction. AND gate 78 operates in identical fashion to enable an up correction.

The output of OR gate 72, designated D, is applied to one input of AND gate 70, and the output of AND gate 60 (FIG. 4) is connected via input terminal 80 to the other input of gate 70. Also, the output of OR gate 74, designated C is applied to an input of AND gate 68, while the output of AND gate 62 (FIG. 4) is connected via input terminal 82 to the other input of gate 68.

The operation of the correction control circuit will now be described by considering a hypothetical operational sequence. As an arbitrary starting point, let the initial state of counter 66 be at zero; the various circuit outputs will then be as indicated for the start condition in Table 1 below:

TABLE 1

| Condition | A | B | $\bar{A}$ | $\bar{B}$ | C | D | E | F | Correction |
|---|---|---|---|---|---|---|---|---|---|
| Start | 0 | 0 | 1 | 1 | 0 | 1 | 1 | 0 | Down. |
| 1st late pulse | 0 | 1 | 1 | 0 | 1 | 1 | 0 | 0 | None. |
| 2nd late pulse | 1 | 0 | 0 | 1 | 1 | 1 | 0 | 0 | Do. |
| 3rd late pulse | 1 | 1 | 0 | 0 | 1 | 0 | 0 | 1 | Up. |

It will be noted from the table that, for this start condition, gate 76 is generating a DC signal enabling down corrections.

Suppose the first pulse applied to control circuit 64 arrives via input terminal 80, thereby indicating the video signal received from the camera is phase lagging the master signal generator. The obvious correction required is "up," but from Table 1 it will be noted that, although the first late pulse drives the counter 66 to count up one pulse to 01, it results in no correction signal. Likewise, the second late pulse drives the counter up to 10, but generates no correction signal. Upon counting up three late pulses (the AB state 11), however, the AB input to AND gate 78 generates a DC signal F enabling up correction.

Subsequent late pulses have no effect on the counter since, as will be noted from the table, gate 70 is not enabled (i.e., D is 0) when the counter (AB) is in the 11 state. Consequently, control circuit 64 will continue to generate an up correction signal until the phase of the derived sync signal steps ahead of the time reference and an early pulse is counted. That is, with counter 66 in the 11 state, a C enable signal is applied to gate 68 to allow the first pulse applied via input terminal 82 to drive the counter to count down one pulse to the 10 state, thereby removing correction signals.

At this time, the derived sync pulses are positioned immediately adjacent to the ideal in-phase point of the time reference. If the phase of the derived sync signal remains ahead of the reference signal, the third consecutive early pulse will drive the counter to the 00 state, thereby generating a down correction signal. When the phase of the derived sync signal steps behind the time reference and a late pulse is counted, the down correction stops. This process may then continue, resulting in a phase jitter about the in-phase point. It is more likely, however, that when the derived sync signal is initially corrected to a position adjacent the in-phase point, it will drift back and forth about the ideal point to drive the counter from 01 to 10 and back. This action places control circuit 64 in a null condition, thereby avoiding correction jitter when the derived signal is approximately in phase with the master signal generator.

Figure 4:
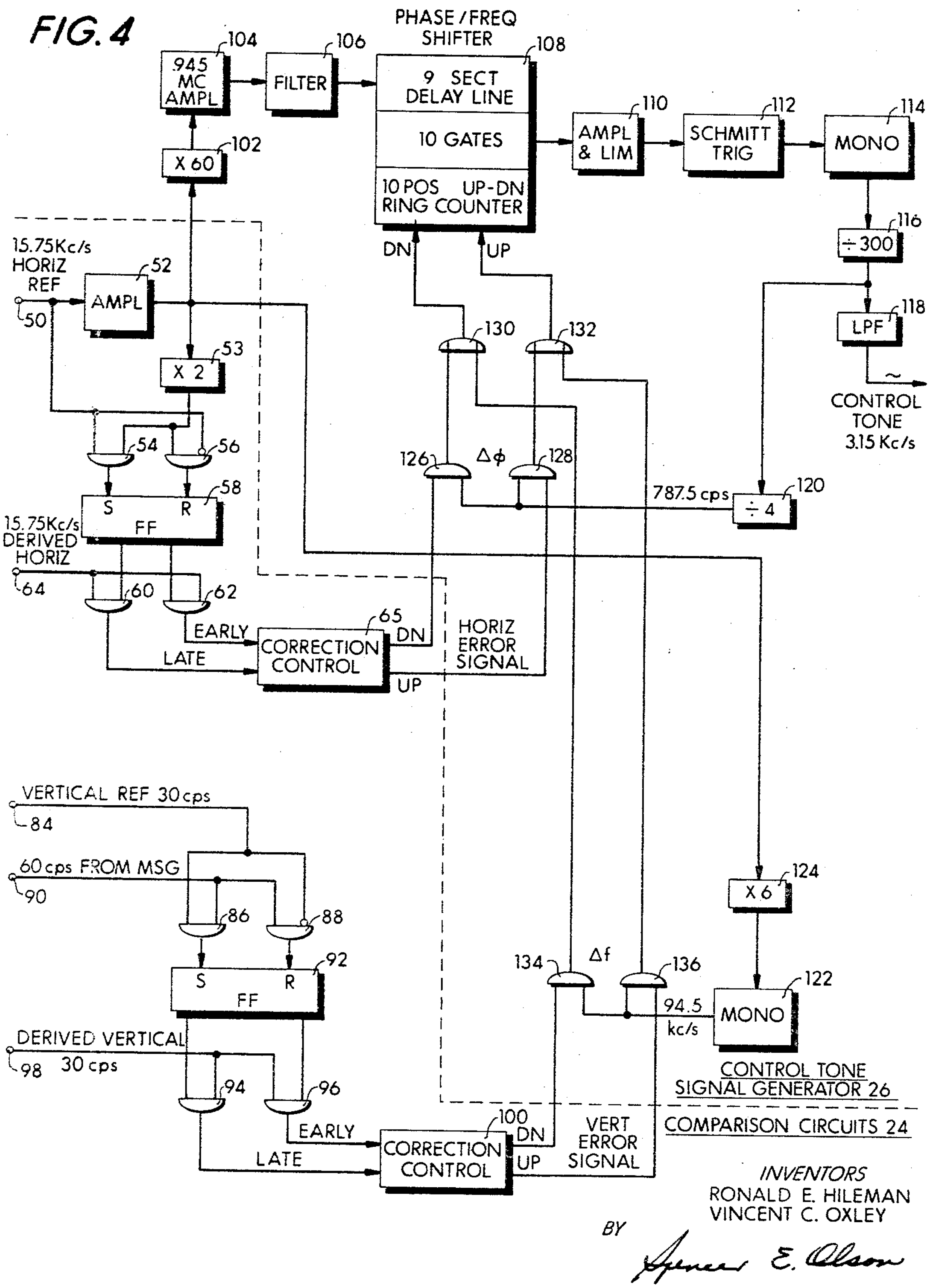
FIG. 4 is a block diagram of comparison circuits and a control tone generator useful in the system of FIG. 1.

Returning now to the description of FIG. 4, the 30 c.p.s. vertical reference signal is applied via input terminal 84 to the enable input of an AND gate 86 and to the inhibit input of an AND gate 88. The 60 c.p.s. pulse train from the master sync generator is applied via input terminal 90 to the other inputs of gates 86 and 88, and the outputs of these gates are respectively connected to the set and reset terminals of a flip-flop circuit 92. This vertical circuit arrangement operates in similar fashion to the horizontal circuit comprising gates 54 and 56 and flip-flop 58. Consequently, flip-flop 92 is in set for one-half of a vertical frame and reset for one-half of a frame to thereby provide a useful vertical time reference.

The set and reset outputs of flip-flop 92 are respectively applied to a pair of AND gates 94 and 96 along with the vertical sync pulses derived from the received video signal, the derived vertical signal being obtained from monostable 44 (FIG. 2) and applied via input terminal 98 of the comparison circuit. Hence, in operation similar to that of the analogous horizontal comparison circuit, if the phase of a derived sync pulse is such that it occurs during the "first" half of a vertical frame of the flip-flop time reference, gate 94 will allow the pulse and gate 96 will inhibit the pulse, indicating that the derived pulse is late with respect to the time reference. If the derived pulse occurs in the "second" half of the vertical frame, gate 94 will inhibit the pulse and gate 96 will allow the pulse, indicating that the derived pulse is early.

Figure 5:
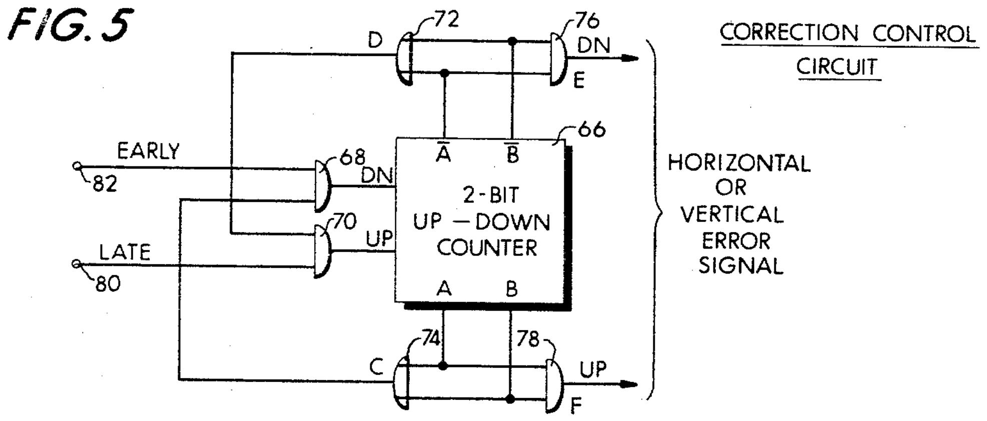
FIG. 5 is a logic circuit diagram of a correction control circuit useful in the comparison circuits of FIG. 4.

The outputs of AND gates 94 and 96 are connected to a correction control circuit 100, which is identical to the control circuit 65 described with reference to FIG. 5. It operates in the same manner as circuit 65 to produce at the E and F outputs of gates 76 and 78 (FIG. 5) vertical error signals for providing frequency correction of the control tone generator.

The control tone signal generator 26 shown in FIG. 4 derives a 3.15 kc./sec. control tone from the horizontal reference signal by means of a circuit comprising: a ×60 frequency multiplier 102 connected to the 15.75 kc./sec. output of amplifier 52; an amplifier 104 and half lattice crystsal filter 106 for serially processing the 945 kc./sec. output of the multiplier 102; a digital phase/frequency shifter 108 connected between the output of filter 106 and the input of an amplifier and limiter circuit 110 to effect correction of the control tone in response to the error signals; a Schmitt trigger circuit 112 and monostable multivibrator 114 serially connected to shape the output waveform of amplifier-limiter 110; a frequency divider 116 connected to the output of monostable 114 for dividing the 945 kc./sec. signal by 300 to provide the desired 3.15 kc./sec. control tone frequency; and, a low pass filter 118 connected at the output of divider 116 to provide a suitable sine wave output from the control tone generator to transmitter 28.

A preferred circuit for use as the digital phase/frequency shifter 108 is the linear modulator described in Patent Nos. 2,923,891 and 2,972,109 of Madison G. Nicholson, Jr., and Patent No. 3,095,509 of Ronald E. Hileman and Howard E. Parks, all assigned to the assignee of the present application. Briefly, this modulator comprises: a multisection delay line, to one end of which a carrier signal is applied, the delay line providing discrete phase differences over the range from a zero reference phase to 360 electrical degrees at the carrier frequency; a plurality of switches or gates connected between respectice taps on the delay line and a common output line; and a source of modulating signal connected in circuit and having characteristics so as to actuate the gates in an unidirectional sequence from one end of the delay line to the other whereby during each full cycle of sweeping the gates, progressively phase-displaced carrier waves are sequentially coupled to the output line. Thus, if the switches are actuated in the direction of progressively retarded phase, one cycle per second is subtracted from the frequency of the original unmodulated carrier wave for each complete cycle of sweeping all of the switches with the modulating signal. If the modulating signal is so applied as to sequentially tap the delay line in the reverse direction, cycles will be added to the carrier frequency. So long as the modulating signal is continuously applied, the frequency of the signal appearing at the output terminal differs from the frequency of the unmodulated carrier by an amount determined by the number of taps and the frequency of the modulating signal.

For the present application, a linear modulator compirsing a delay line with nine sections (ten taps) and ten gates controlled by a ten position up-down ring counter is satisfactroy. Each section of the delay line provides a delay of thirty-six electrical degrees at the carrier frequency. With this circuit a selectable constant phase or frequency deviation from the carrier frequency is attained by varying the frequency of drive pulses applied to the ring counetr, the frequency deviation being equal to the frequency of the drive pulses divided by the number of gating circuits. The direction of the frequency or phase deviation is determined by whether the drive pulses are switched into the forward drive terminal of the ring counter, in which case a "down" correction is effected, or to the backward drive terminal, in which case an "up" correction results. For example, if a drive pulse source having a PRF of 10,000 cycles per second is applied to the forward drive terminal of the counter, the modulator output frequency will be 1,000 cycles per second less than the carrier frequency. If the same rate were applied to the backward drive 1,000 cycles per second would be added to the carrier.

In the control tone generator shown in FIG. 4, an unmodulated carrier signal source of 945,000 c.p.s. is connected from filter 106 to one end of the delay line in phase shifter 108, and the common output line to which the ten tap gates are connected is coupled to amplifier limiter 110. Two gate controlled drive pulse sources are provided for the counter. One source, having a PRF of 787.5 c.p.s., is derived from a divide-by-four circuit 120 from the output of divider 116; this low frequency source, when gated to drive the counter, will effect a deviation in the modulator output frequency of 78.75 c.p.s., thereby resulting in a phase shift of the 3.15 kc./sec. control tone of approximately ¼ c.p.s. (to be precise 0.2625 c.p.s) or about 83 μsecs. per second. The other drive source, having a PRF of 94.5 kc./sec., is employed for effecting a 31.5 c.p.s. frequency shift of the 3.15 kc./sec. control tone; this high frequency drive source is provided at the output of a monostable 122 triggered by a signal derived from a ×6 multiplier 124 from the output of amplifier 52.

The low frequency (787.5 c.p.s.) drive pulse source is connected via AND gates 126 and 128, in parallel, and OR gates 130 and 132, in parallel respectively, to the "down" and "up" correction terminals, respectively, of phase shifter 108. The low frequency drive AND gates are controlled by the horizontal error signal of correction control circuit 65, the "down" and "up" correction output terminals being connected to AND gates 126 and 128, respectively. The high frequency (94.5 kc./sec.) drive pulse source from monostable 122 is connected via AND gates 134 and 136, in parallel, and OR gates 130 and 132, in parallel, to the "up" and "down" correction terminals, respectively, of the phase/frequency shifter. The high frequency drive AND gates are, of course, controlled by the vertical error signal outputs of correction control circuit 100, the "down" terminal being connected to AND gate 134 and the "up" terminal being connected to gate 136.

In operation, if all the error signal outputs are "0," thereby calling for no corrections, the modulator ring counter will receive no drive pulses and will control the first gate to connect the 945 kc./sec. carrier directly to the modulator output, bypassing the delay line; consequently, an unmodulated 3.15 kc./sec. control tone is provided. Upon occurrence of a "1" DC output signal from the "down" terminal of the horizontal error signal source, gate 126 is enabled for the duration of the signal to allow the low frequency drive pulses to be applied to the down correction terminal of the modulator ring counter. The modulator responds by shifting the phase of the control tone by −¼ c.p.s. until the drive pulse source is removed. When the drive source is disabled by a "0" output at the "down" terminal of control circuit 65, the modulator returns the control tone to its original 3.15 kc./sec. frequency.

In like manner, a "1" output from the horizontal error signal "up" terminal enables gate 128 to allow the drive pulse source to be applied to the "up" correction terminal of the counter, thereby to shift the phase of the control tone by +¼ c.p.s. The vertical error signal outputs operate in a similar fashion by enabling gate 134 to effect a −31.5 c.p.s. frequency shift in the control tone and enabling gate 136 to effect a +31.5 c.p.s. frequency shift.

Referring back to FIG. 1, the 3.15 kc./sec. control tone generated at the output of low pass filter 118 (FIG. 4), including any frequency or phase shift corrections, is applied to transmitter 28, wherein the signal may be amplified and transmitted directly to camera 14, or used to modulate a carrier wave $f_1$ for transmission. At camera 14, receiver 30 demodulates the control signal transmitted via link 12, amplifies the recovered control tone, and applies the 3.15 kc./sec. signal, plus or minus any phase or frequency shifts, to camera sync control circuit 32.

Figure 6:
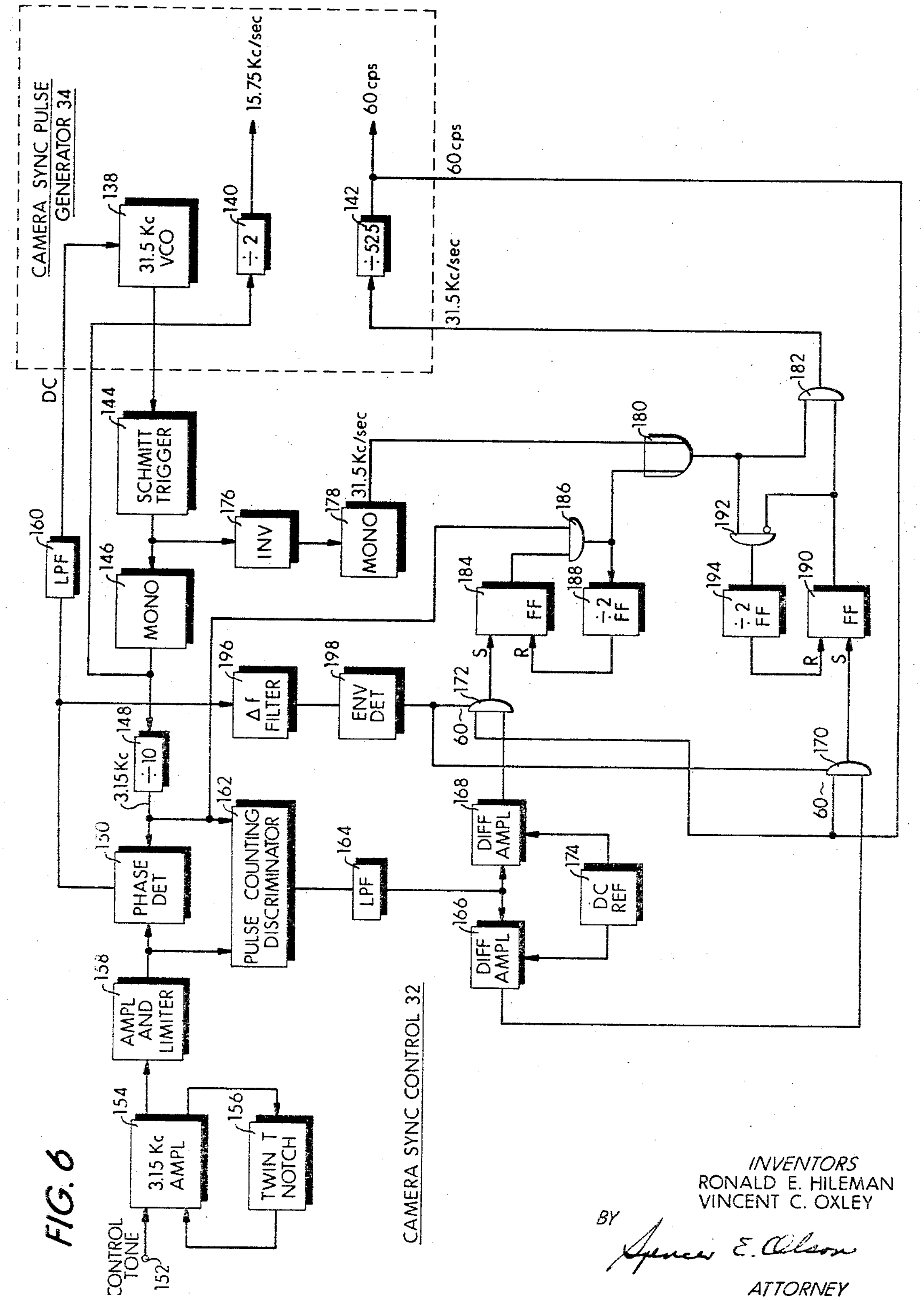
FIG. 6 is a block diagram of a camera synchronizing control circuit useful in the system of FIG. 1.

Referring now to FIG. 6, there is shown a first embodiment of camera synchronizing control circuit 32 comprising: a discriminator and logic network for detecting frequency shifts in the control tone and phase correcting vertical sync pulses in response thereto; and, a phase lock loop for making horizontal sync pulse corrections in response to phase shifts in the control tone. The primary elements of the camera sync pulse generator 34, which is controlled by circuit 32, are also shown (within dashed lines) in FIG. 6; namely, a 31.5 kc. voltage controlled oscillator 138 serving as a drive source; a frequency divider 140 for dividing the oscillator frequency by two to provide the 15.75 kc./sec. horizontal blanking, sync pulse, and line scanning rate; and, a divide-by-525 circuit 142 for providing the 60 c.p.s. vertical blanking, sync pulse, and scanning rate.

Horizontal acquisition and tracking is provided by comparing the phase of the received control tone with the phase of oscillator 138 and generating a control signal to force the 31.5 kc. oscillator into proper phase timing. The phase comparison can be at 31.5 kc. by frequency multiplying the 3.15 kc./sec. control tone to 31.5 kc./sec., or the comparison can be made at 3.15 kc., as shown in FIG. 6, by first dividing the camera 31.5 kc./sec. to 3.15 kc./sec. More specifically, the 31.5 kc./sec. output of oscillator 138 is connected via a Schmitt trigger 144 and monostable 146, for pulse shaping purposes to a divide-by-ten circuit 148. The 3.15 kc. pulse output of divider 148 is then applied as a reference signal to one input terminal of a phase detector 150. The other input to phase detector 150 is derived from the received sinusoidal control tone signal, applied at input terminal 152, amplified in a 3.15 kc. amplifier 154 having a negative feedback connection including a twin T-notch filter 156, and further processed in an amplifier and limiter circuit 158. Phase detector 150 functions to generate an output signal representative of the phase difference between the inputs, which is applied through a low pass filter 160 as a DC signal to control oscillator 138. Since oscillator 138 provides the pulse drive for divide-by-2 circuit 140, in this instance via a connection from the output of monostable 146 to the divider, the 15.75 kc./sec. horizontal sync pulse rate is correspondingly phase corrected as the 31.5 kc. oscillator is voltage adjusted. In this instance, a 0.26 c.p.s. shift in the control tone forces oscillator 138 to shift by 2.6 c.p.s., thereby phase correcting the horizontal sync pulse timing by 1.3 c.p.s. or 83 $\mu$secs. per second. The capture range of this phase lock loop is designed to be sufficient to lock onto the $\pm\frac{1}{4}$ c.p.s. control tone phase shifts and track the horizontal, but narrow enough to provide relatively good stability and noise immunity.

For vertical sync pulse phasing, the frequency of the control tone is detected by use of a pulse counting or other type discriminator, and two fixed voltage references, to provide indication of direction. A detected control tone frequency shift of proper magnitude actuates a logic circuit to inject or delete two 31.5 kc. pulses in the drive source for the vertical sync divider, thereby providing a phase correction equivalent to the period of one horizontal line. Referring to FIG. 6, the input terminals of pulse counting discriminator 162 are connected in parallel to the 3.15 kc. control tone and VCO inputs of phase detector 150. The output of the discriminator, representative of the frequency difference between the inputs, is applied through a low pass filter 164 as a DC signal to a pair of differential amplifiers 166 and 168. The outputs of amplifiers 166 and 168 are respectively connected to input terminals of AND gates 170 and 172. The DC reference voltages for the differentials amplifiers are provided by a source 174 and are of values such that amplifier 166 is operative to enable gate 170 in response to detection of a minus frequency shift in the control tone (i.e., the control tone frequency is less than the 3.15 kc. reference derived from the VCO) and amplifier 168 is operative to enable gate 172 in response to detection of a plus frequency shift in the control tone.

The drive pulse source for the vertical frequency divider 142 comprises an inverter 176, monostable 178, OR gate 180 and AND gate 182 serially connected in that order from the output of Schmitt trigger 144 to the input of the divide-by-525 circuit. The pulse injection logic includes a flip-flop 184 the set input terminal of which is connected to the output of gate 172 and an output terminal of which is connected to an input of AND gate 186. The other input of gate 186 is connected to the 3.15 kc. output of the divide-by-ten circuit 148. The output of gate 186 is connected to an input of OR gate 180 and via a flip-flop 188 to the reset input terminal of flip-flop 184.

The pulse deletion logic includes a flip-flop 190 the set input terminal of which is connected to the output of gate 170 and an output terminal connected in parallel to an input of AND gate 182 and an inhibit input terminal and AND gate 192. The other input of gate 192 is connected to the output of OR gate 180 and its output is connected via flip-flop 194 to the reset input of flip-flop 190.

Actuation of the pulse injection and deletion circuits is accomplished by enabling gates 172 and 170, the other input terminal of each of which is connected to the 60 c.p.s. output divider 142. A vertical enable-lockout feature is also included in the vertical correction logic to control gates 170 and 172 so that they can be enabled only when the camera is receiving a 31.5 c.p.s. frequency shift (modulation) on the control tone. Consequently, the vertical correction circuitry is relatively immune to false triggering as might result from nonoptimum signal-to-noise ratios. The enable-lockout circuit comprises a 31.5 c.p.s. filter 196 and envelope detector 198 serially connected in that order between the phase detector 150 output and control terminals of gates 170 and 172. By this means, a signal from the output of envelope detector 198 will be applied to allow the enablement of gates 170 and 172 only when a 31.5 c.p.s. signal is passed by filter 196. Of course if another $\Delta f$ value is employed for the control tone frequency shift, the filter 196 would be designed accordingly.

In operation, if a +31.5 c.p.s. frequency shift in the control tone is detected, differential amplifier 168 applies a signal to enable gate 172 to allow a 60 c.p.s. pulse to set flip-flop 184. In the set condition, flip-flop 184 enables gates 186 to allow 31.5 kc./sec. pulse source to pass. The allowed 3.15 kc./sec. pulses, in addition to passing through OR gate 180 and normally enabled gate 182 to divider 142, also trigger flip-flop 188. Flip-flop 188 functions like a divide-by-2 circuit so that the second 3.15 kc./sec. pulse resets flip-flop 184. Consequently, since the 31.5 kc./sec. pulse train applied through OR gate 180 is shifted 180° by inverter 176, each 60 c.p.s. pulse allowed through gate 172 is effective to insert two 3.15 kc./sec. pulses in the 31.5 kc./sec. train applied to divider 142, each of the 3.15 kc. pulses being placed between a pair of 31.5 kc./sec. pulses.

If a —31.5 c.p.s. control tone frequency shift is detected, differential amplifier 166 applied a signal to enable gate 170 to allow a 60 c.p.s. pulse to set flip-flop 190. In the set condition, flip-flop 190 removes the enabling signal from gate 182 and the disabling signal from gate 192, thereby blocking the pulse source for divider 142, but allowing the 31.5 kc./sec pulse source to pass through gate 192. The 31.5 kc./sec. pulses allowed through gate 192 trigger flip-flop 194, which acts as a divide-by-2 circuit to reset flip-flop 190 in response to the second 31.5 kc./sec. pulse. Hence, each 60 c.p.s. pulse allowed through gate 170 is effective to delete two 31.5 kc./sec. pulses from the divider 142 pulse source.

Since, as mentioned above, a pair of 31.5 kc./sec. pulses is equivalent in time to one horizontal line, the overall circuit operation described above is effective to phase correct the vertical sync pulse timing at a rate of 60 lines per second.

Returning to FIG. 1 for a moment, the 15.75 kc./sec. and 60 c.p.s. pulse outputs of camera sync generator 34 are coupled in the conventional manner to camera tube and modulator circuit 36 to control the camera scanning generator and provide horizontal and vertical sync pulse and blanking information for generation of the composite video signal. The composite video signal is then applied to transmitter 38 for transmission by radio or cable link 16 (channel A) to the master control receiver 18.

In the composite vertical and horizontal control of the synchronization of the camera, vertical lock-on, horizontal lock-on, and horizontal tracking are accomplished sequentially in that order. For example, if the picture received at the master control center is out of vertical synchronization with the master sync generator, the resulting 31.5 c.p.s. shift in the control tone applied to camera sync control circuit 32 effects phase correction of the vertical sync pulse output but is beyond the capture range of the 31.5 kc. oscillator phase lock loop. Upon synchronization of the vertical, any remaining horizontal asynchronization will result in ¼ c.p.s. phase shifts in the control tone applied to the camera sync control circuit. These phase shifts are within capture range of the phase lock loop and, hence, correct the horizontal sync pulse output; lack of a vertical enable signal from envelope detector 198 (FIG. 6) will cause the vertical correction logic to remain inactive. Upon synchronization of the horizontal, the phase lock loop will continue to track the control tone, thereby compensating for any motion of the camera.

Figures 7, 9:
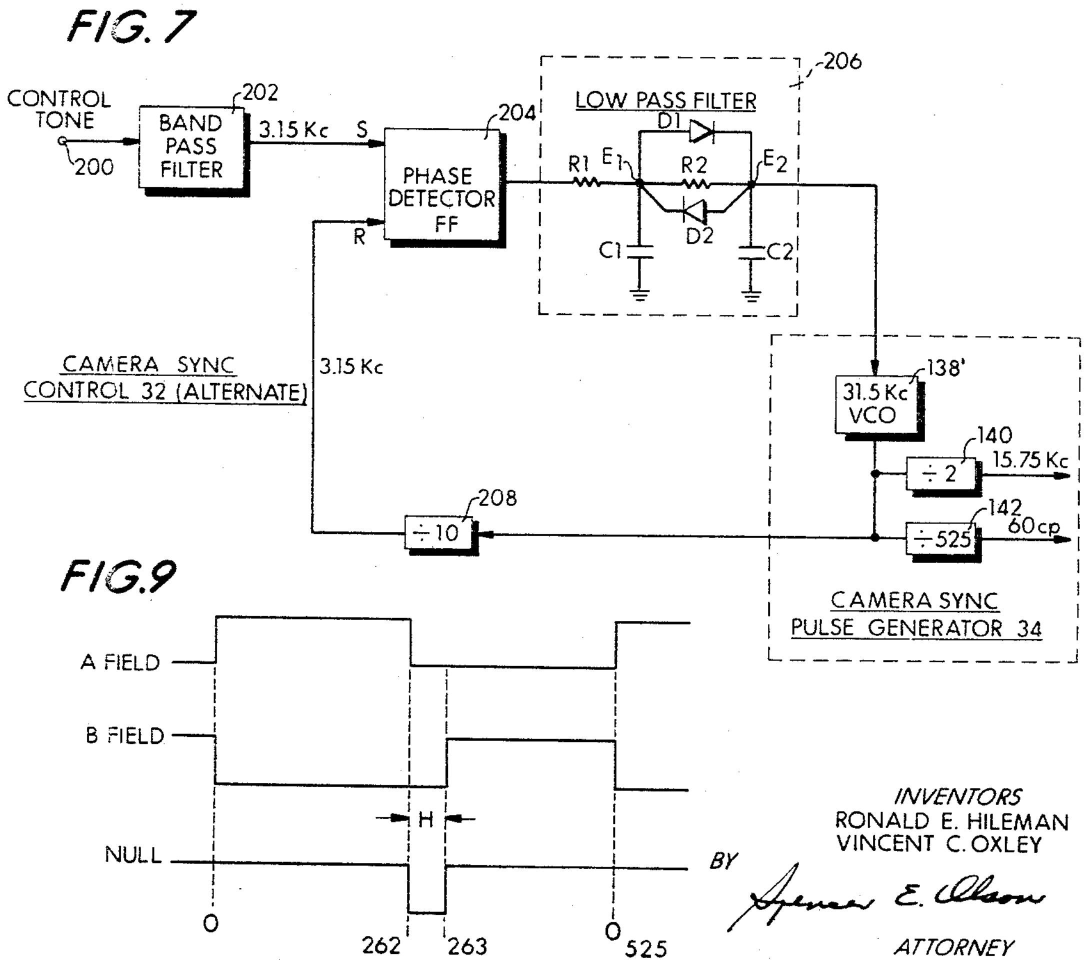
FIG. 7 is a block diagram of an alternate camera synchronizing control circuit useful in the system of FIG. 1.

A television camera synchronization control system employing alternate circuit embodiments for the sync control circuit 32, comparison circuits 24, and control tone signal generator 26 of FIG. 1 will now be described. Use of these circuit alternatives results in a system implementation which is somewhat simpler and more economical, although not providing the high degree of stability and noise immunity of the FIG. 4 and 6 embodiments. The most significant circuit simplification provided by the alternate approach lies in the camera synchronization control circuit 32, the alternate configuration for which is shown in FIG. 7. Here it will be noted that both the vertical and horizontal sync pulse phase corrections are accomplished by a single phase lock loop. Correction information is still transmitted by means of frequency and phase shifts of the control tone, but for this second embodiment of the system, the frequency shifts are made much smaller than the 31.5 c.p.s. vertical correction signal previously described so as to be within the capture range of the phase lock loop. Also, the loop is designed to have a two state adaptive feature by use of a unique low pass filter circuit; when not in phase lock, a wide capture range is provided (much wider than the FIG. 6 loop), and when phase locked, the loop is automatically switched to a narrow capture range to provide effective filtering action during tracking.

Referring to FIG. 7, the second embodiment of sync control circuit 32 is shown along with sync pulse generator 34, which includes a 31.5 kc. voltage controlled oscillator 138' and the divide-by-2 and divide-by-525 circuits 140 and 142. VCO 138' is the same as VCO 138 except that it may include output pulse shaping circuits, since its output is shown connected directly to dividers 140 and 142. The demodulated 3.15 kc./sec. control tone from receiver 30 is applied via input terminal 200 to a bandpass filter 202 which provides a degree of noise rejection. After passing through filter 202 the control tone is applied to the set terminal of a flip-flop phase detector 204 for phase comparison with a 3.15 kc. feedback signal from VCO 138', which is applied to the reset terminal of the phase detector. The output of phase detector 204 is applied via a unique low pass filter circuit 206 to control 31.5 kc. oscillator. Filter circuit 206 provides for the attenuation of the phase jitter introduced by the transmission path from the control center. The output of oscillator 138', in addition to being applied to the horizontal and vertical frequency dividers, is connected via a divide-by-ten circuit to provide the 3.15 kc. feedback to the phase detector.

The low pass filter 206 comprises a pair of cascaded RC sections with a pair of diodes connected in shunt with the second resistor. The first and second sections consist of resistor-capacitor combinations R1, C1 and R2, C2, respectively. Resistors R1 and R2 are serially connected between the input and output of the filter; capacitor C1 is connected between the junction of R1 and R2 and ground; and, capacitor C2 is connected between the output terminal of R2 and ground. The cutoff frequencies are widely separated (e.g., 100 to 1) so that the phase lock loop is stable. The response of the loop filter is determined primarily by the lower corner frequency due to R2 and C2. The higher corner frequency determined by R1 and C1 introduces appreciable phase shift at the frequency where R2 and C2 are causing substantial attenuation of loop gain. Hence, if the loop gain is less than unity at this frequency, the loop is stable.

When the loop is not in phase lock, a difference frequency will appear at the phase detector output. The first filter section is designed to pass the difference frequency. The second RC section without diodes would attenuate the difference frequency if it were large. This would result in a small capture range. However the addition of the diodes causes the AC swing to the difference frequency to be conducted on to $C_2$. When the diodes conduct the capacitors $C_1$ and $C_2$ are effectively in parallel and the filter has a corner frequency at $$f_c=\frac{1}{2\pi R_1(C_1+C_2)}$$

which provides a wide capture range.

Once the loop has phase locked, the difference frequency disappears and the signal at $R_1C_1$ (junction $E_1$) will become fixed at some DC voltage. The second filter section $R_2C_2$ will charge to the same DC potential (at junction $E_2$). When the two potentials are equal, the diodes are both off. The low pass filter then has a time constant determined by $R_2$ and $C_2$ as long as the differences between $E_1$ and $E_2$ do not exceed the turn-on voltages of the diodes.

In one successfully demonstrated embodiment of the present invention which includes the FIG. 7 implementation of the camera sync control circuit, sync pulse phase corrections are made sequentially at three different rates: very fast for vertical phasing, medium for horizontal acquisition, and then slow for horizontal tracking. These rates are all applied as required to 0.1 $\mu$sec. phase corrections in a 3.15 kc./sec. control tone. For correction of vertical sync pulse timing, the 0.1 $\mu$sec. phase shifts are applied at a 15.75 kc./sec. rate, thereby resulting in a 5 c.p.s. frequency shift in the control tone. Application of this frequency shifted control tone to the phase lock loop forces oscillator 138' to shift by 50 c.p.s.; since a pair of 31.5 kc./sec. pulses are equivalent in time to one horizontal line, this shift is effective to phase correct the vertical sync pulse timing at a rate of 25 lines per second. In this instance, therefore, the 5 c.p.s. shift is within the relatively wide capture range of the phase lock loop.

Upon completion of vertical synchronization, the control center automatically switches to the horizontal synchronizing mode. In the horizontal mode the 0.1 $\mu$sec. phase shifts are applied at a 246 p.p.s. rate, thereby resulting in a phase shift in the 3.15 kc./sec. control tone of approximately 25 $\mu$secs. per second. Oscillator 138' follows this phase shift to phase correct the horizontal sync pulse timing at an acquisition rate of 25 $\mu$secs. per second. Upon synchronization of the horizontal, filter circuit 206 automatically switches the loop to a narrow capture range, as described above, to increase the stability and filter action of the loop for the tracking mode.

For horizontal tracking, the control center applies the 0.1 μsec. phase shifts at a rate of 9 per second.

The alternate or second embodiment of phase comparison circuits 24 and control tone generator 26 will now be described with reference to the block diagram shown in FIG. 8. In this case the reference signals provided by master sync generator 22 comprise a 15.75 kc./sec. pulse train for horizontal reference, as with the first embodiment, but the vertical reference consists of a pair of 30 p.p.s. A field and B field signals derived from the 525 pulse frames of the horizontal reference output. Referring to FIG. 9, field A pulse duration coincides with the first 262 pulses of a given frame and field B pulse duration covers the last 262 pulses of the frame (pulse 263–525); it will be noted that this leaves a null zone of one horizontal line between fields. This null zone is used in the system by passing the A and B field signals through an OR gate to obtain a 30 p.p.s. negative going null signal.

The 30 p.p.s. A and B field vertical reference signals are respectively applied via comparison circuit input terminals 210 and 212 as inputs to AND gates 214 and 216, respectively, and the 30 p.p.s. derived vertical signal from monostable 44 (FIG. 2) is applied to the other inputs of these gates via input terminal 218. The outputs of gates 214 and 216 are respectively connected to the set and reset terminals of a vertical decision flip-flop circuit 220. Hence, if the phase of a derived vertical sync pulse is such that it occurs during the A field, gate 214 will allow the pulse to trigger flip-flop 220 to the set condition, thereby indicating that the derived pulse is early with respect to the time reference and causing a down correction signal to be generated from the flip-flop. If the derived pulse occurs during the B field, gate 216 will allow triggering of the decision flip-flop to the reset condition, indicating the signal from the camera is late with respect to the control center reference and causing an up correction signal to be generated. The vertical error signal outputs of decision flip-flop 220 are respectively connected to a pair of AND gates 222 and 224 to enable frequency correction of the control tone generator.

Recognition of the condition of vertical synchronization is provided by making use of the H null zone between the end of the A field pulse and the beginning of the B field pulse as derived by passing the A and B signals through an OR gate 225. The null signal output of 225, shown in FIG. 9, is applied directly to an AND gate 226 and via inverter 228 to an AND gate 230. The 30 p.p.s. derived vertical signal is applied to the other inputs of gates 226 and 230. The output of gate 226 is connected to the input of a scale-of-four counter 232 having a flip-flop output circuit, and the gate 230 output is connected to means for resetting the counter and flip-flop circuit 232. The output of the flip-flop in circuit 232 is applied to input terminals of AND gates 222 and 224 and to the trigger input terminal of a 1.3 second monostable 234.

The derived vertical sync signal is synchronized in phase with the reference signal when the time of occurrence of each sync pulse falls within the null zone having a width H. In operation, therefore, gate 226 is enabled during the A or B fields and disabled during the negative null pulse. Consequently, if the derived vertical sync signal is out of synchronization, gate 226 will allow the 30 p.p.s. sync pulses to drive the scale-of-four counter. After a count of four pulses, the output flip-flop is triggered to the set condition and the resulting output signal enables the vertical error signal gates 222 and 224 so that the necessary frequency corrections may be made. The count-of-four safeguards against false triggering of the circuit 232 flip-flop in the presence of a single noise pulse.

When after phase corrections of the camera sync pulse timing the derived vertical pulses start occurring in the null zone, gate 226 is disabled and the sync pulse source is allowed to reset the counter and flip-flop 232 to thereby shut off vertical corrections. In addition, the trailing edge of the flip-flop output, when reset, triggers the 1.3 second monostable to start horizontal phase corrections.

The horizontal comparison circuit comprises a conventional early-late gate circuit 236 having 31.5 kc./sec. and 15.75 kc./sec. reference input rates and the 15.75 kc./sec. derived horizontal sync signal input. For example, the early-late gate may comprise the circuit arrangement of AND gates 54 and 56, flip-flop 58, and gates 60 and 62 shown in FIG. 4, except that the early and late outputs of gates 62 and 60 would be applied to the set and reset terminals of a decision flip-flop to derive the down and up horizontal error signal outputs. The derived horizontal signal is applied via input terminal 238, and the 15.75 kc./sec. reference is applied at terminal 240, with a ×2 circuit 242 being employed to derive the 31.5 kc./sec. reference. The horizontal error signal output terminals of the early-late gate are connected to the forward and backward control terminals of divide-by-64 up-down counter 244 to control the direction of phase correction of the generated control tone.

Figure 8:
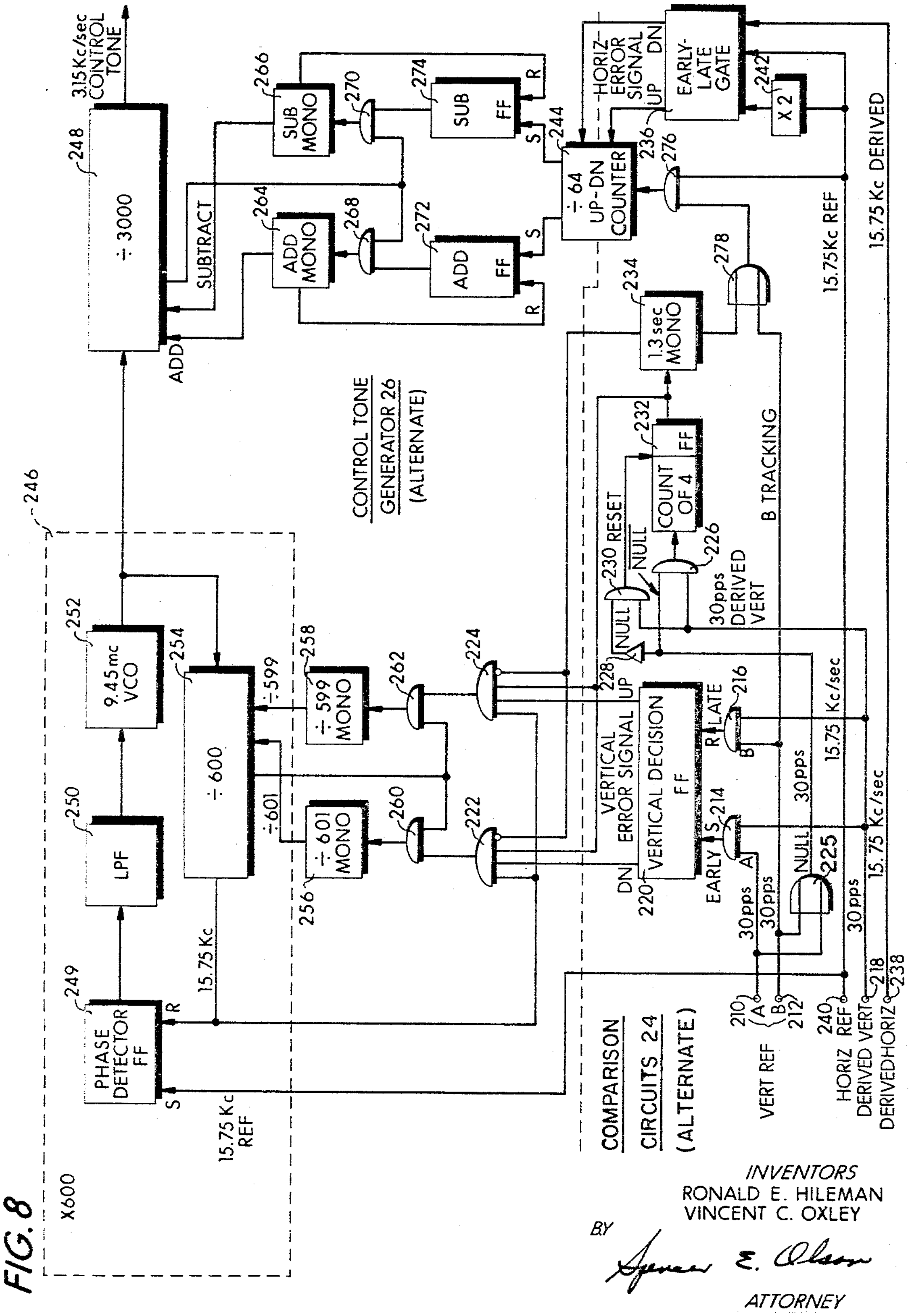
FIG. 8 is a block diagram of an alternate embodiment of the comparison circuits and control tone generator useful in the system of FIG. 1; and, FIG. 9 is a timing diagram (not to scale) of certain of the waveforms employed in the circuit described by FIG. 8.

As in the circuit of FIG. 4, the control tone generator of the FIG. 8 circuit derives a 3.15 kc./sec. control tone from the horizontal reference signal; in this instance, however, the tone is derived by means of a ×600 multiplier 246 and a divide-by-3000 circuit 248. Multiplying the 15.75 kc./sec. frequency source to 9.45 mc., in this manner, enables pulses to be added and subtracted at this frequency, thereby conveniently providing the desired 0.1 μsec. phase correction in the output 3.15 kc. control tone.

The ×600 multiplier is a phase locked loop similar to the camera phase lock loop (FIG. 7), except that a digital divide-by-600 circuit is used. Specifically, the 15.75 kc./sec. horizontal reference pulse train at terminal 240 is applied to the set terminal of a phase detector flip-flop 249. The frequency difference output signal of the detector is applied via a conventional low pass filter 250 to control the frequency of a 9.45 μsec. oscillator 252. The output of the voltage controlled oscillator is connected via the divide-by-3000 circuit 248 to the control tone output terminal and via a divide-by-600 circuit 254 to provide a nominal 15.75 kc. feedback signal to the reset terminal of detector 249.

The ÷600 and ÷3000 circuits are digital counters and may comprise a series of flip-flop stages with an output reset monostable having feedback connections to certain of the flip-flops to provide the desired count. For example, the ÷600 circuit 254 may comprise ten flip-flop stages plus a reset monostable having feedback connections to the fourth, sixth, eighth and ninth stage flip-flops, and ÷3000 circuit 248 may consist of 12 flip-flop stages with appropriate reset feedback connections.

As mentioned previously with respect to a specific implementation of the second embodiment of this control system, vertical sync pulse timing corrections at the camera are achieved by 5 c.p.s. frequency shifts in the control tone; this is equivalent to applying 0.1 μsec. phase corrections to the control tone at 15.75 kc./sec. rate. Such frequency shifting of the control tone in response to vertical comparison is attained by effectively adding or blocking the 0.1 μsec. trigger pulses applied to the ÷600 circuit, thereby making it a ÷599 circuit or ÷601 circuit. Pulse blocking is achieved by triggering a monostable to "crow-bar" the output of the first stage flip-flop of the counter. For an up correction, however, pulses are not actually added since that would double the required operating rate of the first flip-flop; the same effect is obtained by firing a monostable which drives the first flip-flop to the state to which it would have gone if the trigger were added. The pulse adding and deleting monostables, of course, must be precisely timed with respect to the 0.1 μsec. triggers to avoid pulse splitting.

In FIG. 8, monostable 256 provides the pulse blocking signals to the ÷600 counter and monostable 258 provides the pulse adding signals. To achieve proper phasing of the triggers, each monostable is fired by the leading edge of an output of the second stage flip-flop of the counter applied via respective AND gates 260 and 262. These AND gates are enabled at a 15.75 kc./sec. rate by a pulse stream derived from the reset monostable at the output of divider 254 and connected to gates 260 and 262 via AND gates 222 and 224, respectively. Hence, presuming circuit 232 is providing an enabling signal to gates 222 and 224 and mono 234 is not providing a disabling signal, a down correction signal from the vertical decision flip-flop enables gate 222 to allow the 15.75 kc. rate to enable gate 260 to allow firing of mono 256 at a 15.75 kc./sec. rate phased to precisely block 0.1 $\mu$sec. counter input trigger pulses. In like manner, an up correction from the vertical error signal source enables gate 224 to allow enabling of gate 262 and firing of mono 258 at the 15.75 kc./sec. rate to effectively add trigger pulses.

In the disclosed implementation, horizontal timing corrections are achieved by 25 $\mu$secs. per second phase shifts in the control tone, such phase shifts being attained by effectively adding or blocking the 0.1 $\mu$sec. trigger pulses applied to the ÷3000 counter at a 246 p.p.s. rate. In this instance, monostable 264 generates the pulse adding signals and monostable 266 provides the pulse blocking signals. The leading edge of the output of the second stage flip-flop of the ÷3000 counter is applied to fire the monostables via AND gates 268 and 270, respectively. These AND gates are respectively enabled by command storage flip-flops 272 and 274, respectively, each of which are set by a 246 p.p.s. signal generated by ÷64 counter 244 and reset by the trailing edges of monostables 264 and 266, respectively. The 246 p.p.s. rate is derived from the 15.75 kc. reference source via an AND gate 276 and the ÷64 counter. Gate 276 is enabled via OR gate 278 by the output signal from monostable 234 after it is fired at the conclusion of the vertical correction mode, and the duration of enablement is determined by the period of the mono which in this instance is 1.3 seconds. Mono 234 also applies a disable signal to the vertical gates 222 and 224 during this period.

In operation, the conclusion of vertical synchronization automatically switches off the vertical correction mode and switches on the horizontal correction mode for 1.3 seconds, a period long enough to correct ½ a horizontal line, the worst case of horizontal asynchronization. The horizontal error signals from early-late gate 236 control the direction of the ÷64 counter, which provides an output only when there have been 64 more pulses than minuses, or vice versa. This counting lowers the phase lock loop gain, thereby enhancing stability; it also averages out noise and limits the random walk of the system. During horizontal acquisition, all the corrections are applied in one direction and therefore are applied at 15.75 kc./64 or 246 p.p.s. to either the add flip-flop 272 or the subtract flip-flop 274. Hence, an up correction signal from the early-late gate directs the ÷64 to trigger mono 272 to the set state at a 246 p.p.s. rate. This enables gate 268 to allow firing of add mono 264 at a 246 p.p.s. rate phased to effectively add input trigger pulses to the ÷3000 counter, mono 264 also resetting the add flip-flop at a 246 p.p.s. rate. In like manner a down correction signal controls the ÷64 to set mono 274 at a 246 p.p.s. rate to enable 270 to allow firing of mono 266 at the 246 p.p.s. rate to precisely block trigger pulses.

When proper phase is reached there will be both plus and minus decisions, and the ÷64 will slow down the rate of corrections. After horizontal acquisition is complete it is desirable to slow the correction rate still further so that the remaining random walk is slow enough not to disturb the viewer. This is accomplished at the end of the 1.3 second monostable period by inhibiting most of the drive rate to the ÷64 counter; more specifically, by allowing the B field signal from terminal 212 to do the gating. The 30 p.p.s. B signal is applied to gate 276 via OR gate 278 and is effective to reduce the shift rate to a tracking rate of about nine corrections per second.

In summary, a closed loop system has been provided for controlling both horizontal and vertical synchronization of a selected television camera from a control center. The system will correct for any degree of asynchronization, including the worst case deviations of one field for vertical sync and ½ line for horizontal, in a rapid automatic manner. A narrow audio bandwidth control signal is employed which may be transmitted to any camera location by either radio or cable.

At the control center, a unique sync signal separator derives from the received composite video signal a 15.75 kc./sec. horizontal sync pulse signal and a 30 p.p.s. vertical sync signal frame marker. These derived sync signals are respectively phase compared with horizontal and vertical reference signals generated at the control center. If the received picture is out of vertical synchronization with the reference, a vertical phase error signal is applied to shift the frequency of the control tone by a fixed amount in the proper direction; the means for making frequency and phase corrections in the control tone comprises either a digital phase modulator or means for adding or deleting pulses at a specified frequency in the tone generating process. The camera sync control circuit responds to the frequency shift of the control tone to phase correct the vertical sync pulses generated by the camera. After vertical acquisition, the horizontal phase error signal at the control center results in a fixed phase shift of the control tone in the proper direction. The camera control circuit responds to this phase shift in the control tone to effect phase correction of the horizontal sync pulse timing at the camera. After horizontal acquisition, the system automatically goes into a tracking mode.

A first embodiment of the invention employs a camera sync control circuit including a phase lock loop for effecting horizontal timing corrections and a frequency discriminator and logic network for effecting vertical timing corrections. For the 60 lines per second vertical acquisition rate mentioned in the example of this embodiment, the system would correct for one field out of sync in about 4.4 seconds. For the 83 $\mu$secs. per second horizontal acquisition rate, it would take about 0.4 second to correct ½ horizontal line. A vertical enable-lockout feature is also included to assure that the vertical correction circuit responds only to the specified control tone frequency shift. This embodiment offers the features of improved stability and noise immunity.

A second embodiment of the invention employs a much simpler camera control circuit comprising a single phase lock loop. In this instance the worst case horizontal acquisition time is 1.3 seconds, and the worst case vertical acquisition time is 10.6 seconds.

While particular embodiments of the invention have been shown and described, it is to be understood that applicants do not wish to be limited thereto since many modifications will now become apparent to ones skilled in the art. For example, the invention is obviously not limited to the control tone frequency and frequency and phase shift values presented in the examples. Hence, the acquisition times mentioned are also to be considered illustrative only. If it were desired to improve even further the reliability of the control center circuitry shown in FIG. 4, it is contemplated that conventional ambiguity elimination circuitry could be added to each of the comparison circuits, thereby insuring that horizontal and vertical corrections are made only when the derived pulses fall outside specified limits about the time reference; in this manner the probability of proper vertical and horizontal shutoff and horizontal tracking is improved. Also a system whereby the camera generated horizontal and vertical sync signals are transmitted directly to the control center, rather than via a composite video signal, is also within the contemplation of the invention. Further, it is contemplated that the system concept is readily adaptable to television systems other than the 525 line system in present common use in the United States. Applicants therefore contemplate by the appended claims to cover all such modifications as fall within the true spirit and scope of their invention.

What is claimed is:

1. An electronic system for automatically controlling the synchronization of a selected television camera comprising: means included in said camera for generating horizontal and vertical synchronizing pulses and transmitting a composite video signal including said horizontal and vertical synchronizing pulses, means for receiving said composite video signal, first, second, third and fourth monostable multivibrators each having a trigger input terminal, a first AND gate having first and second inputs and an output, means for applying said received composite video signal to the trigger input terminals of said first and second monostables and to a first input of said first AND gate, means for obtaining from the output of said first monostable a derived horizontal signal representative of said horizontal synchronizing pulses, means connecting the output of said second monostable to a second input of said first AND gate, means connecting the output of said first AND gate to the trigger input of said third monostable, a second AND gate having first and second inputs and an output, means connecting the output of said first monostable to a first input of said second AND gate, means connecting the output of said third monostable to a second input of said second AND gate, means connecting the output of said second AND gate to the trigger input of said fourth monostable, means for obtaining from the output of said fourth monostable a derived vertical signal representative of certain of said vertical synchronizing pulses, said first monostable having a period greater than one-half of the period of the repetition rate of said horizontal synchronizing pulses, said second monostable having a period greater than the pulse width of said horizontal synchronizing pulses but less than one-half the period of the repetition rate of said horizontal synchronizing pulses, said third monostable having a period sufficiently long that the trailing edge of its output pulses occur after the trailing edge of a time overlapping vertical synchronizing pulse, and said fourth monostable having a period less than the period of its firing rate, a master synchronizing signal generator having sources of horizontal and vertical reference signals, means for comparing the phase of said derived vertical signal with respect to said generated vertical reference signal to produce a vertical synchronizing error signal indicative of the direction of phase correction required to align the derived signal with the reference signal, means for comparing the phase of said derived horizontal signal with respect to said generated horizontal reference signal to produce a horizontal synchronizing error signal indicative of the direction of phase correction required to align the derived signal with the reference signal, a control tone generator including means responsive to said vertical synchronizing error signal for shifting the frequency of said control tone in the indicated direction and means responsive to said horizontal synchronizing error signal for shifting the phase of said control tone in the indicated direction, means for transmitting said control tone with any phase and frequency shifts, means included in said television camera for receiving said control tone, and camera control means responsive to said received control tone for phase correcting said synchronizing pulse generating means in said camera whereby the phase correction of the vertical synchronizing pulses is substantially in response to the frequency shifts of said control tone and the phase correction of the horizontal synchronizing pulses is substantially in response to the phase shifts of said control tone.

2. An electronic system for automatically controlling the synchronization of a selected television camera comprising: means included in said camera for generating horizontal and vertical synchronizing pulses and transmitting a composite video signal including said horizontal and vertical synchronizing pulses, means for receiving said composite video signal, means for deriving horizontal and vertical signals representative respectively of said horizontal and certain of said vertical synchronizing pulses from said received video signal, a master synchronizing signal generator having sources of horizontal and vertical reference signals, an early-late gate having first and second output terminals and operative to phase compare said derived vertical signal with respect to said generated vertical reference signal and provide output pulses at the repetition rate of said derived vertical signal from the output terminal corresponding to the direction of detected phase error, a two-bit reversible counter having forward and backward drive terminals and operative to provide a set of AB outputs and a set of $\overline{AB}$ outputs, first and second AND gates each having first and second input terminals, means connecting the first and second outputs of said early-late gate to the first input terminals of said first and second AND gates, respectively, means respectively connecting the outputs of said first and second AND gates to the forward and backward output terminals of said counter, third and fourth AND gates having input terminals connected in parallel to the AB outputs of said counter, means connecting the output of said third gate to the second input of said first AND gate, fifth and sixth AND gates having input terminals connected in parallel to the $\overline{AB}$ outputs of said counter and means connecting the output of said fifth gate to the second input of said second AND gate, a vertical synchronizing error signal indicative of the direction of phase correction required to align the derived signal with the reference signal being generated from the outputs of said fourth and sixth gates, means for comparing the phase of said derived horizontal signal with respect to said generated horizontal reference signal to produce a horizontal synchronizing error signal indicative of the direction of phase correction required to align the derived signal with the reference signal, a control tone generator including means responsive to said vertical synchronizing error signal for shifting the frequency of said control tone in the indicated direction and means responsive to said horizontal synchronizing error signal for shifting the phase of said control tone in the indicated direction, means for transmitting said control tone with any phase and frequency shifts, means included in said television camera for receiving said control tone, and camera control means responsive to said received control tone for phase correcting said synchronizing pulse generating means in said camera whereby the phase correction of the vertical synchronizing pulses is substantially in response to the frequency shifts of said control tone and the phase correction of the horizontal synchronizing pulses is substantially in response to the phase shifts of said control tone.

3. An electronic system for automatically controlling the synchronization of a selected television camera comprising: means included in said camera for generating horizontal and vertical synchronizing pulses and transmitting a composite video signal including said horizontal and vertical synchronizing pulses; means for receiving said composite video signal; means for deriving horizontal and vertical signals representative respectively of said horizontal and certain of said vertical synchronizing pulses from said received video signal; a master synchronizing signal generator having sources of horizontal and vertical reference signals, said vertical reference signal consisting of first and second pulse trains each at one-half the repetition rate of said vertical synchronizing pulses, the trailing edge of the pulses of said second reference train coinciding in time with the leading edge of the pulses of said first reference train and the trailing edge of the pulses of said first reference train being separated in time from the leading edge of the pulses of said second reference train by a null zone; means for comparing the phase of said derived vertical signal with respect to said generated vertical reference signal to produce a vertical synchronizing error signal indicative of the direction of phase correction required to align the derived signal with the reference signal which includes, a counter having a drive input AND gate and an output flip-flop circuit, an OR gate, means connecting said first and second vertical reference pulse trains to a first input terminal of said counter AND gate via said OR gate, means connecting said derived vertical signal to a second input terminal of said counter AND gate, said derived vertical signal being enabled to drive said counter via said counter AND gate by said vertical reference pulse trains except when the phase of said derived vertical signal coincides in time with said null zone, a set of vertical error signal gates, a monostable, means connecting the output of said counter flip-flop to control said error signal gates and said monostable, means connecting the output of said monostable to control the phase shift means in said control tone generator, an inverter, a second AND gate, means connecting the output of said OR gate via said inverter to a first input terminal of said second AND gate, means connecting said derived vertical signal to a second input terminal of said second AND gate, and means connecting the output of said second AND gate to control reset of said counter; means for comparing the phase of said derived horizontal signal with respect to said generated horizontal reference signal to produce a horizontal synchronizing error signal indicative of the direction of phase correction required to align the derived signal with the reference signal; a control tone generator including means responsive to said vertical synchronizing error signal for shifting the frequency of said control tone in the indicated direction and means responsive to said horizontal synchronizing error signal for shifting the phase of said control tone in the indicated direction; means for transmitting said control tone with any phase and frequency shifts; means included in said television camera for receiving said control tone; and, camera control means responsive to said received control tone for phase correcting said synchronizing pulse generating means in said camera whereby the phase correction of the vertical synchronizing pulses is substantially in response to the frequency shifts of said control tone and the phase correction of the horizontal synchronizing pulses is substantially in response to the phase shifts of said control tone.

4. An electronic system for automatically controlling the synchronization of a selected television camera comprising: means included in said camera for generating horizontal and vertical synchronizing pulses and transmitting a composite video signal including said horizontal and vertical synchronizing pulses, means for receiving said composite video signal, means for deriving horizontal and vertical signals representative respectively of said horizontal and certain of said vertical synchronizing pulses from said received video signal, a master synchronizing signal generator having sources of horizontal and vertical reference signals, means for comparing the phase of said derived vertical signal with respect to said generated vertical reference signal to produce a vertical synchronizing error signal indicative of the direction of phase correction required to align the derived signal with the reference signal, means for comparing the phase of said derived horizontal signal with respect to said generated horizontal reference signal to produce a horizontal syncronizing error signal indicative of the direction of phase correction required to align the derived signal with the reference signal, a frequency multiplier, means connecting said horizontal reference signal to the input of said frequency multiplier, a digital phase and frequency shifter having carrier input and output terminals and forward and backawrd shift control terminals, means connecting the output of said multiplier to the carrier input terminal of said digital shifter, a frequency divider, means connecting the carrier output terminal of said digital shifter to the input of said divider, means for obtaining a control tone from the output of said divider, a source of pulses at a first frequency, first and second gating means connecting said first frequency pulse source to the forward and backward shift control terminals, respectively, of said digital shifter, means connecting said vertical synchronizing error signal to control said first and second gating means to thereby shift the frequency of said control tone in the indicated direction, a source of pulses at a second frequency, third and fourth gating means connecting said second frequency pulse source to the forward and backward shift control terminals, respectively, of said digital shifter, means connecting said horizontal synchronizing error signal to control said third and fourth gating means to thereby shift the phase of said control tone in the indicated direction, means for transmitting said control tone with any phase and frequency shifts, means included in said television camera for receiving said control tone, and camera control means responsive to said received control tone for phase correcting said synchronizing pulse generating means in said camera whereby the phase correction of the vertical synchronizing pulses is substantially in response to the frequency shifts of said control tone and the phase correction of the horizontal synchronizing pulses is substantially in response to the phase shifts of said control zone.

5. A control system in accordance with claim 4 wherein said digital phase and frequency shifter comprises, a multisection delay line connected to said carrier input terminal and having a plurality of taps, a plurality of gates connected between respective taps on said delay line and said carrier output terminal, and a reversible ring counter having forward and backward drive terminals and a plurality of stages each having an output connected to control a respective one of said plurality of gates, said forward and backward drive terminals being the forward and backward shift control terminals of said digital shifter.

6. An electronic system for automatically controlling the synchronization of a selected television camera comprising: means included in said camera for generating horizontal and vertical synchronizing pulses and transmitting a composite video signal including said horizontal and vertical synchronizing pulses; means for receiving said composite video signal; means for deriving horizontal and vertical signals representative respectively of said horizontal and certain of said vertical synchronizing pulses from said received video signal; a master synchronizing signal generator having sources of horizontal and vertical reference signals; means for comparing the phase of said derived signal with respect to said generated vertical reference signal to produce a vertical synchronizing error signal indicative of the direction of phase correction required to align the derived signal with the reference signal; means for comparing the phase of said derived horizontal signal with respect to said generated horizontal reference signal to produce a horizontal synchronizing error signal indicative of the direction of phase correction required to align the derived signal with the reference signal; a frequency multiplier having input and output terminals, said multiplier comprising a phase locked loop including a voltage controlled oscillator, a phase detector having a feedback input terminal and a reference input terminal, a first frequency divider connected between the output of said oscillator and said feedback input terminal, and means including a low pass filter connecting the output of said phase detector to control the frequency of said oscillator; means connecting said horizontal reference signal to the input of said frequency multiplier; a second frequency divider; means connecting the pulse output of said multiplier to the input of said second divider; means for deriving a control tone from the output of said second divider; first and second monostable circuits connected to said first divider, said first monostable being operative when triggered to effectively add one pulse to the input pulses applied to said first divider and said second monostable being operative when triggered to block one of the input pulses applied to said first divider; a source of pulses at a first frequency; first and second gating means connecting said first frequency pulse source to control the triggering of said first and second monostable circuits, respectively; means connecting said vertical error signal to control said first and second gating means to thereby shift the frequency of said control tone in the indicated direction; third and fourth monostable circuits connected to said second divider, said third monostable being operative when triggered to effectively add one pulse to the input pulses applied to said second divider and said fourth monostable being operative when triggered to block one of the input pulses applied to said second divider; a source of pulses at a second frequency including a third frequency divider consisting of a reversible counter having forward and backard control terminals; means connecting the output of said second frequency source to control the triggering of said third monostable only when said reversible counter is operating predominantly in the forward direction; means connecting the output of said second frequency source to control the triggering of said fourth monostable only when said reversible counter is operating predominantly in the backward direction; means connecting said horizontal synchronizing error signal to the forward and backward control terminals of said reversible counter to thereby shift the phase of said control tone in the indicated direction; means for transmitting said control tone with any phase and frequency shifts; means included in said television camera for receiving said control tone; and, camera control means responsive to said received control tone for phase correcting said synchronizing pulse generating means in said camera whereby the phase correction of the vertical synchronizing pulses is substantially in response to the frequency shifts of said control tone and the phase correction of the horizontal synchronozing pulses is substantially in response to the phase shifts of said control tone.

7. An electronic system for automatically controlling the synchronization of a selected television camera comprising: included in said camera, a voltage controlled oscillator, respective means for deriving horizontal and vertical synchronizing pulses from the output of said oscillator, and means for transmitting a composite video signal including said horizontal and vertical synchronizing pulses; means for receiving said composite video signal; means for deriving horizontal and vertical signals representative respectively of said horizontal and certain of said vertical synchronizing pulses from said received video signal; a master synchronizing signal generator having sources of horizontal and vertical reference signals; means for comparing the phase of said derived vertical signal with respect to said generated vertical reference signal to produce a vertical synchronizing error signal indicative of the direction of phase correction required to align the derived signal with the reference signal; means for comparing the phase of said derived horizontal signal with respect to said generated horizontal reference signal to produce a horizontal synchronizing error signal indicative of the direction of phase correction required to align the derived signal with the reference signal; a control tone generator including means responsive to said vertical synchronizing error signal for shifting the frequency of said control tone in the indicated direction and means responsive to said horizontal synchronizing error signal for shifting the phase of said control tone in the indicated direction; means for transmitting said control tone with any phase and frequency shifts; means included in said television camera for receiving said control tone; a phase detector having two input terminals; means connecting said received control tone to the first input terminal of said phase detector; means including a frequency divider connecting the output of said oscillator as a reference signal to the second input terminal of said phase detector; means including a low pass filter connecting the output of said phase detector to control said oscillator, the phase lock loop including said phase detector, low pass filter, voltage controlled oscillator and divider having a capture range such that said loop is operative in response to the phase shifts of said control tone to phase correct said oscillator but unresponsive to said frequency shifts of said control tone; first and second gate circuits connected to control said means for deriving vertical synchronizing pulses from the output of said oscillator; an insertion pulse source connected to an input of said first gate; means connecting said oscillator output pulse rate to an input of said second gate; a source of gating rate pulses connected to inputs of said first and second gates; a frequency discriminator having first and second input terminals connected in parallel with the control tone and reference signal input terminals of said phase detector and operative to provide an output signal representative of the frequency difference between the control tone and reference signals applied thereto; first and second differential amplifiers; means connecting the output signal of said discriminator to the inputs of said first and second differential amplifiers; means connecting said first and second differential amplifiers to control enablement of said first and second gate circuits, respectively; a first reference voltage source for said first amplifier of a value rendering said amplifier operative to enable said first gate in response to detection of a plus frequency shift in the control tone; a second reference voltage source for said second amplifier of a value rendering said amplifier operative to enable said second gate in response to detection of a minus frequency shift in the control tone, and first gate being operative when enabled to insert pulses in the oscillator signal applied to said means for deriving vertical synchronizing pulses and said second gate being operative when enabled to delete pulses in the oscillator signal applied to the means for deriving vertical synchronizing pulses; and, means including a filter and envelope detector connected between the output of said phase detector and control inputs of said first and second gate circuits for allowing enablement of said first and second gates only in response to frequency shifts in said control tone of a predetermined amount.

8. An electronic system for automatically controlling the synchronization of a selected television camera comprising: included in said camera, a voltage controlled oscillator, respective means for deriving horizontal and vertical synchronizing pulses from the output of said oscillator, and means for transmitting a composite video signal including said horizontal and vertical synchronizing pulses; means for receiving said composite video signal; means for deriving horizontal and vertical signals representative respectively of said horizontal and certain of said vertical synchronizing pulses from said received video signal; a master synchronizing signal generator having sources of horizontal and vertical reference signals; means for comparing the phase of said derived vertical signal with respect to said generated vertical reference signal to produce a vertical synchronizing error signal indicative of the direction of phase correction required to align the derived signal with the reference signal; means for comparing the phase of said derived horizontal signal with respect to said generated horizontal reference signal to produce a horizontal synchronizing error signal indicative of the direction of phase correction required to align the derived signal with the reference signal; a control tone generator including means responsive to said vertical synchronizing error signal for shifting the frequency of said control tone in the indicated direction and means responsive to said horizontal synchronizing error signal for shifting the phase of said control tone in the indicated direction; means for transmitting said control tone with any phase and frequency shifts; means included in said television camera for receiving said control tone; a phase detector having two input terminals; means connecting said received control tone to the first input terminal of said phase detector; means including a frequency divider connecting the output of said oscillator as a reference signal to the second input terminal of said phase detector; means including a low pass filter connecting the output of said phase detector to control said oscillator, the phase lock loop including said phase detector, low pass filter, voltage controlled oscillator and divider having a capture range such that said loop is operative in response to both the frequency and phase shifts of said control tone to frequency and phase correct said oscillator; and, means associated with said low pass filter for controlling the capture range of said phase lock loop in response to the output of said phase detector.

References Cited

UNITED STATES PATENTS 2,753,396 7/1956 Gore ............ 178—69.5

ROBERT L. GRIFFIN, *Primary Examiner.*

ROBERT L. RICHARDSON, *Assistant Examiner.*